(12) United States Patent
Becker et al.

(10) Patent No.: US 11,466,779 B2
(45) Date of Patent: Oct. 11, 2022

(54) SEAL, IN PARTICULAR FOR A ROTARY BALL VALVE FITTING

(71) Applicant: SOGEFI AIR & COOLING, Guyancourt (FR)

(72) Inventors: Nicolas Becker, Porte du Ried (FR); Francis Rolland, Rochester Hills, MI (US)

(73) Assignee: SOGEFI AIR & COOLING, Guyancourt (FR)

( * ) Notice: Subject to any disclaimer, the term of this patent is extended or adjusted under 35 U.S.C. 154(b) by 50 days.

(21) Appl. No.: 17/054,927

(22) PCT Filed: May 16, 2019

(86) PCT No.: PCT/EP2019/062612
§ 371 (c)(1),
(2) Date: Nov. 12, 2020

(87) PCT Pub. No.: WO2019/219807
PCT Pub. Date: Nov. 21, 2019

(65) Prior Publication Data
US 2021/0254717 A1 Aug. 19, 2021

(30) Foreign Application Priority Data
May 18, 2018 (FR) ..................................... 18 54152

(51) Int. Cl.
*F16K 5/06* (2006.01)
*F16J 15/3236* (2016.01)
*F16J 15/16* (2006.01)
*F16K 27/06* (2006.01)

(52) U.S. Cl.
CPC ......... *F16J 15/3236* (2013.01); *F16K 5/0678* (2013.01); *F16J 15/164* (2013.01); *F16K 27/067* (2013.01)

(58) Field of Classification Search
CPC .... F16J 15/3236; F16J 15/164; F16K 5/0678; F16K 27/067; F16K 5/0673
USPC ........................ 251/172, 174, 315.01–315.16
See application file for complete search history.

(56) References Cited

U.S. PATENT DOCUMENTS

| | | | |
|---|---|---|---|
| 3,184,213 A | 5/1965 | Anderson | |
| 3,233,862 A * | 2/1966 | Marsh | F16K 3/0227 251/315.1 |
| 4,061,307 A * | 12/1977 | Yoshiike | F16K 5/0673 251/315.08 |
| 4,258,901 A * | 3/1981 | Zinnai | F16K 1/2266 251/173 |

(Continued)

FOREIGN PATENT DOCUMENTS

| | | |
|---|---|---|
| DE | 2444716 | 4/1976 |
| DE | 19520900 | 12/1996 |
| GB | 2065276 | 6/1981 |

OTHER PUBLICATIONS

International Search Report dated Jul. 18, 2019.
Search Report dated Aug. 19, 2020.

*Primary Examiner* — John Bastianelli
(74) *Attorney, Agent, or Firm* — Ipsilon USA, LLP

(57) ABSTRACT

A seal (1) is provided, in particular for a rotary ball valve fitting (2). The seal (1) has an annular body (4) that is resilient, flexible and provided with a radial lip (4') and a rigid sealing ring (5) that are made in one piece. A valve, such as a rotary ball valve may include such a seal.

10 Claims, 7 Drawing Sheets

(56) References Cited

U.S. PATENT DOCUMENTS

| | | | | |
|---|---|---|---|---|
| 4,290,581 A | * | 9/1981 | Moran | F16K 5/207 |
| | | | | 251/368 |
| 4,410,165 A | * | 10/1983 | Koch | F16K 5/0673 |
| | | | | 251/315.13 |
| 4,899,980 A | * | 2/1990 | Kemp | F16K 41/046 |
| | | | | 251/174 |
| 5,088,687 A | * | 2/1992 | Stender | F16K 5/0668 |
| | | | | 251/315.12 |
| 5,467,966 A | * | 11/1995 | Nicholson | F16K 3/0227 |
| | | | | 251/328 |
| 2011/0133109 A1 | | 6/2011 | Mircea | |
| 2011/1033109 | | 6/2011 | Corp | |
| 2012/0313026 A1 | * | 12/2012 | Nguyen | F16K 5/06 |
| | | | | 251/315.1 |
| 2018/0112786 A1 | | 4/2018 | England et al. | |

* cited by examiner

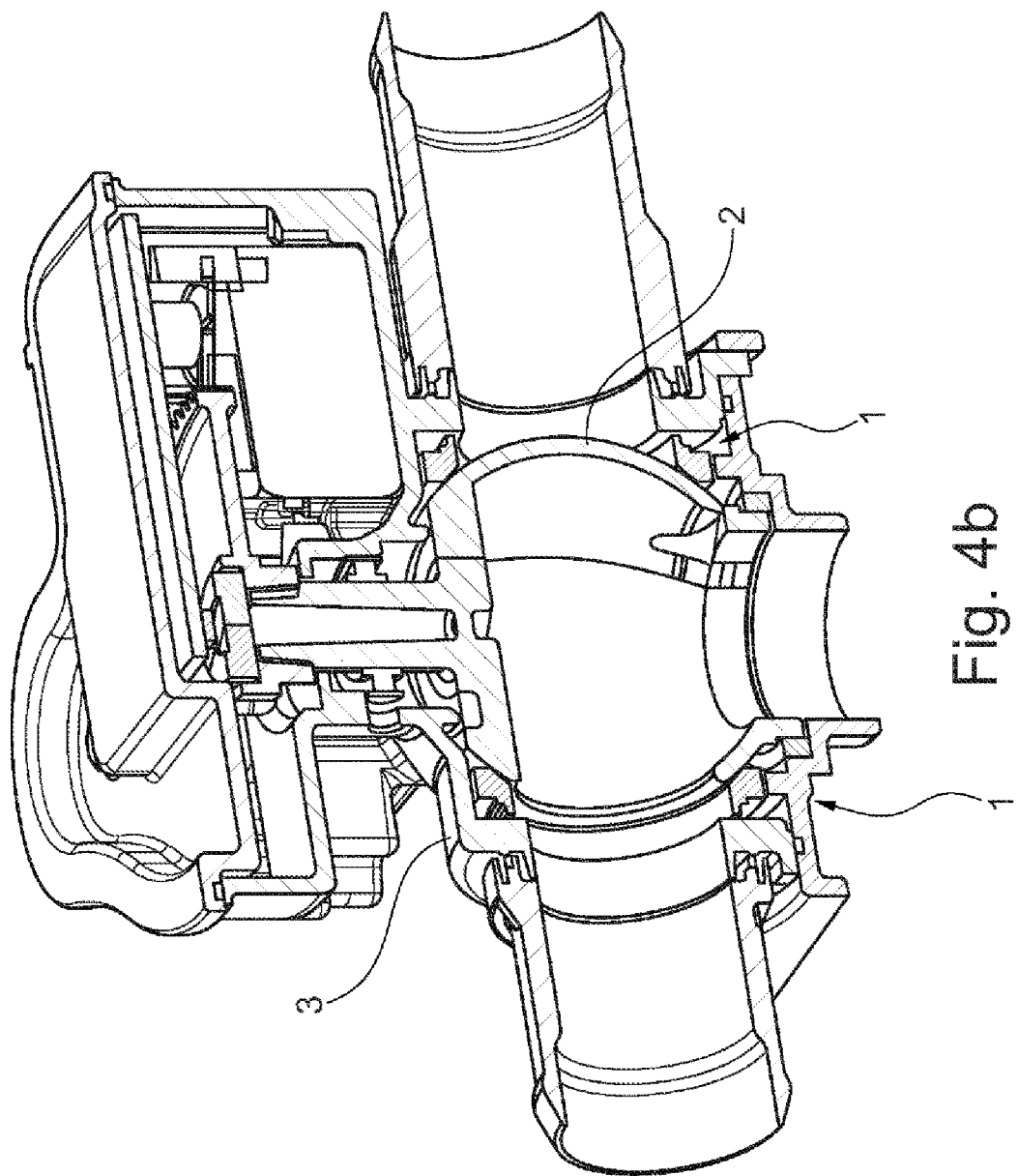

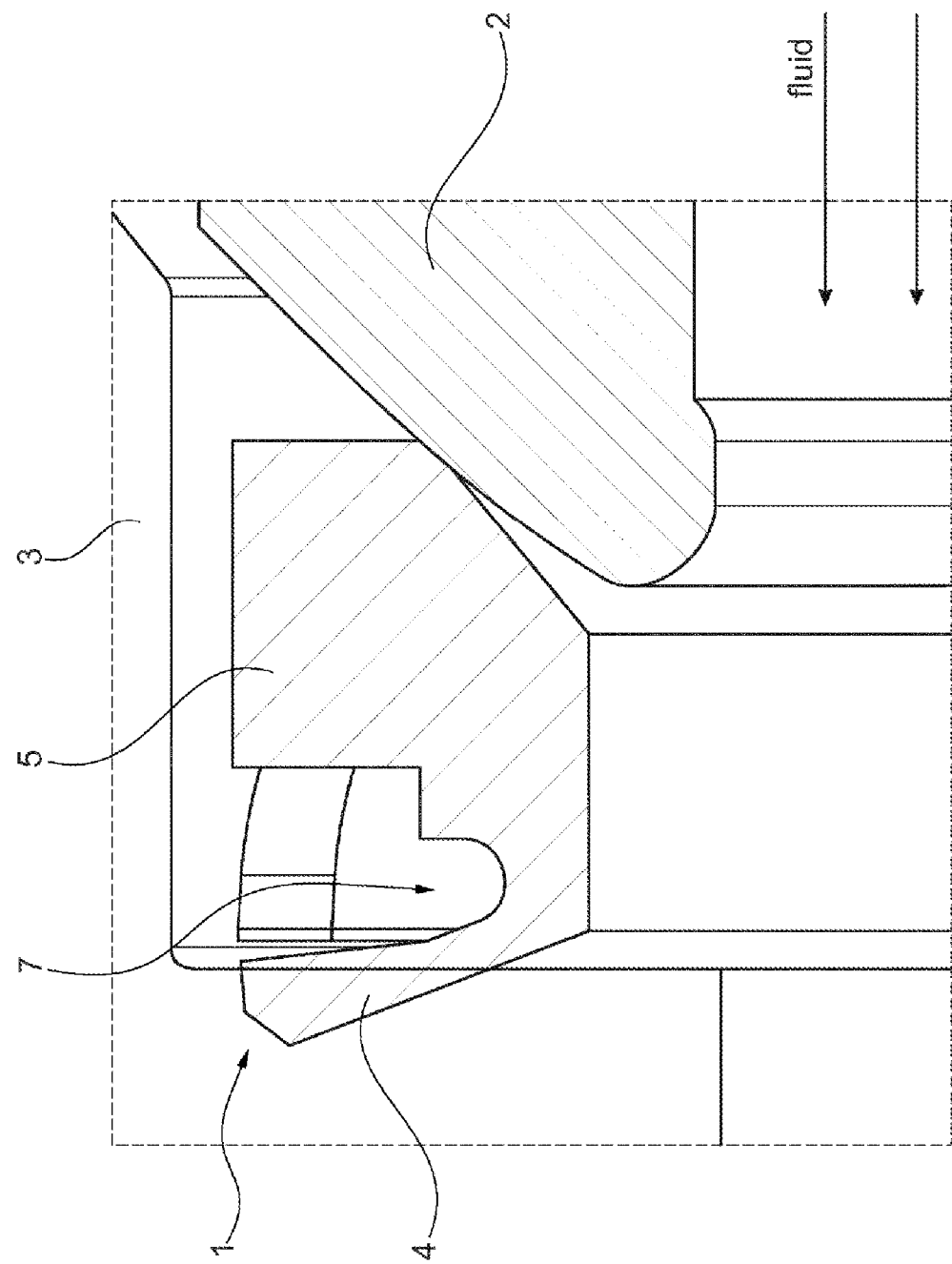

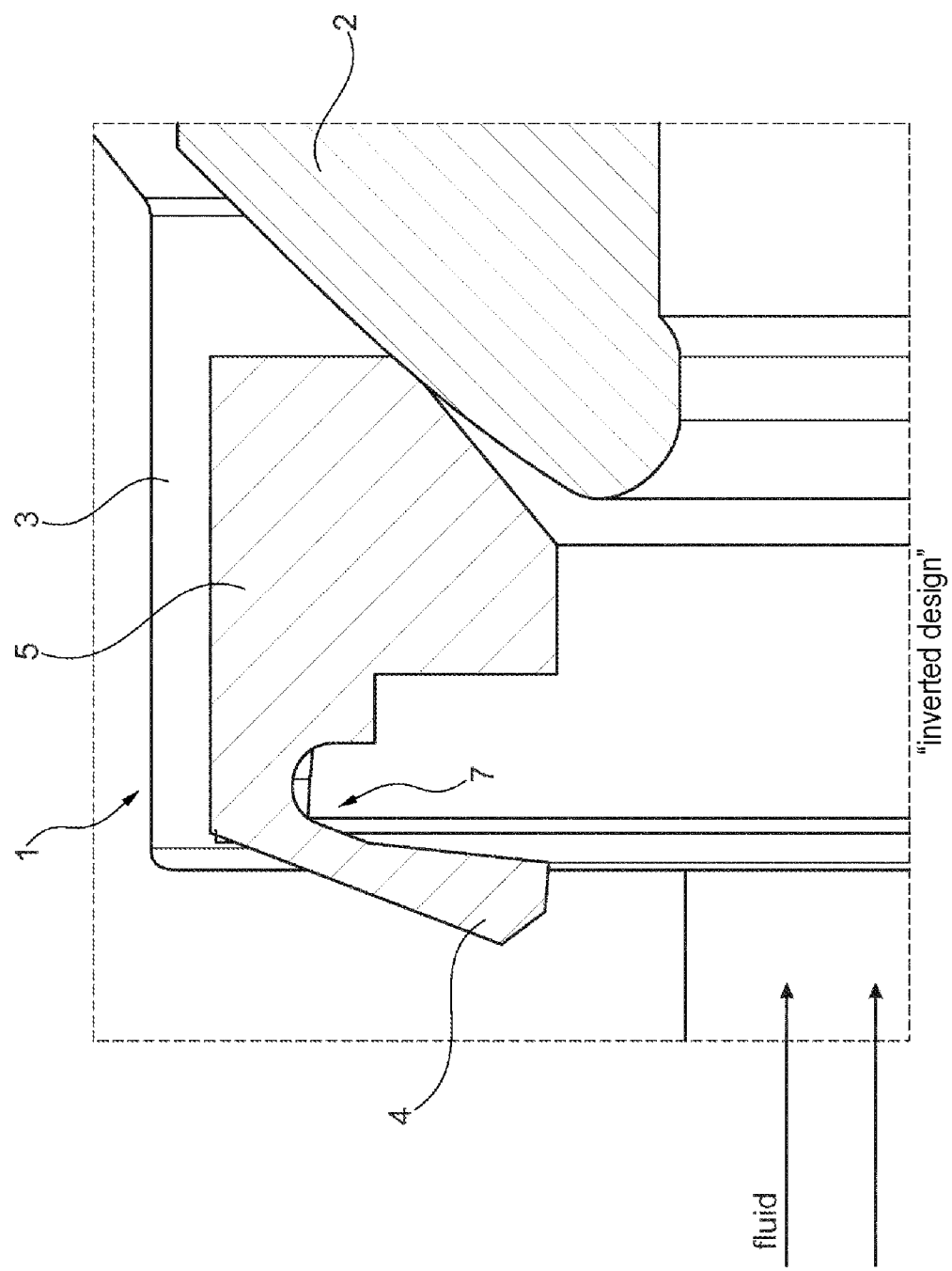

SEAL, IN PARTICULAR FOR A ROTARY BALL VALVE FITTING

RELATED APPLICATION

This application is a National Phase of PCT/EP2019/062612 filed on May 16, 2019 which claims the benefit of priority from French Patent Application No. 18 54152, filed on May 18, 2018, the entirety of which are incorporated by reference.

FIELD OF THE INVENTION

The present invention concerns the field of devices for controlling the flow of fluid, more particularly, proportional valves or valves functioning according to the principle referred to as the "all or nothing" principle and, more particularly, that of rotary ball valves, and concerns a seal, in particular for such a rotary ball valve.

DESCRIPTION OF RELATED ART

In many constructions of rotary ball valves, in particular valves with spherical valve balls, one of the major technological issues, for which it is often difficult to find an effective and reliable solution, is that of achieving a tight seal at the sealing interfaces between the valve ball and the valve body, and more particularly at the inlet and/or outlet openings of said valve body, which are often subjected to high pressures and the surface of the valve ball.

Composite sealing devices that ensure tight sealing with the valve ball due to the presence of an elastic prestressing means urging the sealing means (ring) against the valve ball are already known from documents EP 1 529 937, EP 2 052 177, U.S. Pat. No. 6,499,720, DE 10 2009 014 047 and EP 2 910 826 in particular.

However, in the proposed constructions, the seals used are always made up of several parts or elements, generally a sealing ring that bears on the valve ball, an annular sealing body and a reinforcement ring, which multiplies the number of interfaces (and therefore the risks of leaks) in a disadvantageous manner and also complicates the assembly of the different components.

Objects and Summary:

There is therefore a need to provide a more reliable seal which, unlike known seals, does not require a previous assembly operation.

The aim of the present invention is to propose a solution that overcomes at least some of these disadvantages.

To this end, the invention proposes a seal, in particular for a rotary ball valve, preferably for a rotary ball valve with at least two ways and advantageously three ways, the seal comprising a static annular sealing body that is resilient and flexible and provided with a radial lip, and a rigid dynamic sealing ring made from a material with a low friction coefficient, carried by said static annular sealing body, the structural unit formed by the static annular sealing body and the dynamic sealing ring being arranged so as to be able to slide in a guided manner in the emerging passage portion of the opening in question, the rigid sealing ring coming to bear against said rotary valve ball, and the inner face of said sealing ring, opposite that which is in contact with the rotary valve ball, coming to face the inner face of the radial lip of the annular sealing body, opposite the face coming into contact with the hollow body of the valve, the thrust force produced by the fluid at said seal causing these two elements to move apart in order to ensure tight sealing, the seal being characterized in that the static sealing annular body that is resilient, flexible and provided with a radial lip and the rigid dynamic sealing ring are produced as one piece.

It also concerns a rotary ball valve, preferably a two-way spherical rotary ball valve, characterized in that it comprises a seal according to the invention, a valve body defining a receiving chamber and a ball valve received in the receiving chamber of said valve body, characterized in that it comprises a seal also according to the invention.

BRIEF DESCRIPTION OF THE DRAWINGS

The invention will be more clearly understood from the description that follows, which relates to preferred embodiments, provided as non-limiting examples, and explained with reference to the appended schematic drawings, in which:

FIGS. 4a and 4b respectively show a perspective view of a three-way ball valve complete with its mounting plate and electric actuator or gear motor, for example for a motor vehicle, and a perspective cross-sectional view in a vertical plane passing through the center of the valve of FIG. 4a;

FIG. 5 shows a highly enlarged simplified view of the active zone of the seal according to the invention; and FIG. 6 shows a highly enlarged simplified view of the active zone of an inverted seal according to the invention for a variant in which the direction of flow of the fluid is reversed.

DETAILED DESCRIPTION

Figure 1:
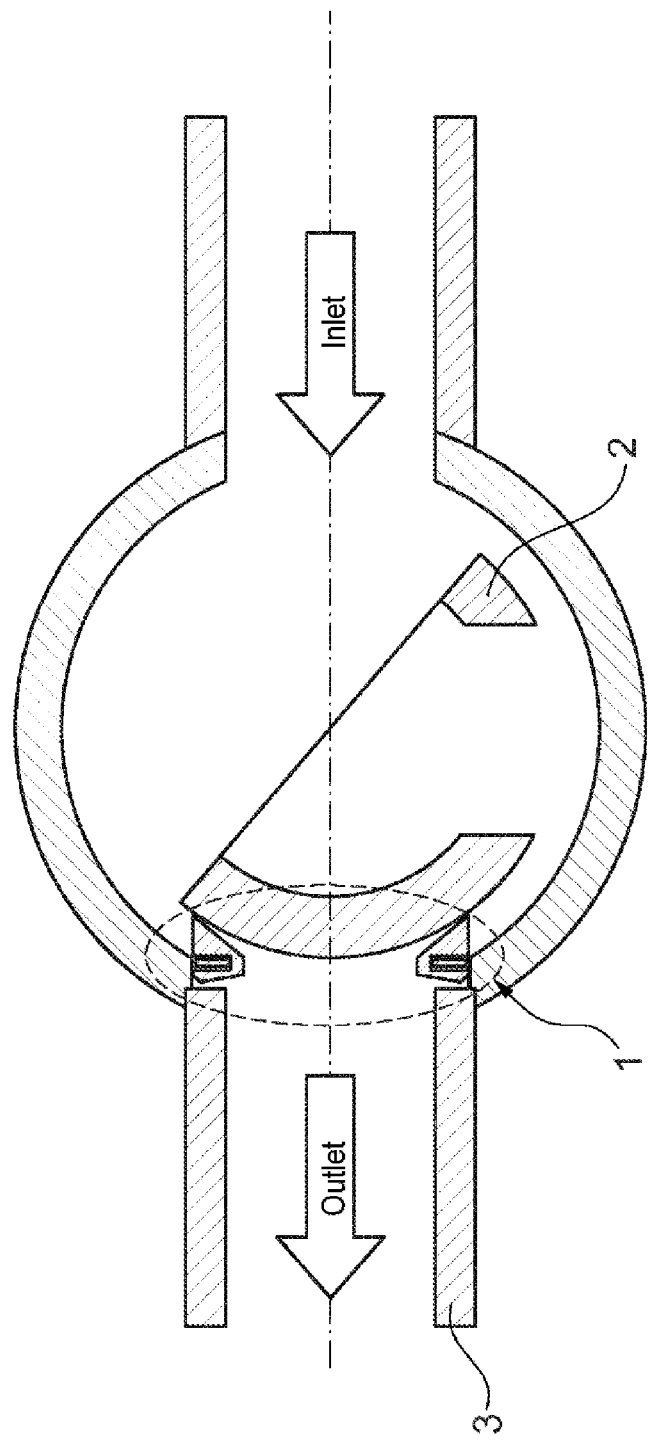
FIG. 1 shows a simplified schematic cross-sectional view of a spherical ball valve with an inlet and an outlet (a valve referred to as a two-way valve), provided with a seal according to the invention, in a suggested closed position.
Figure 2:
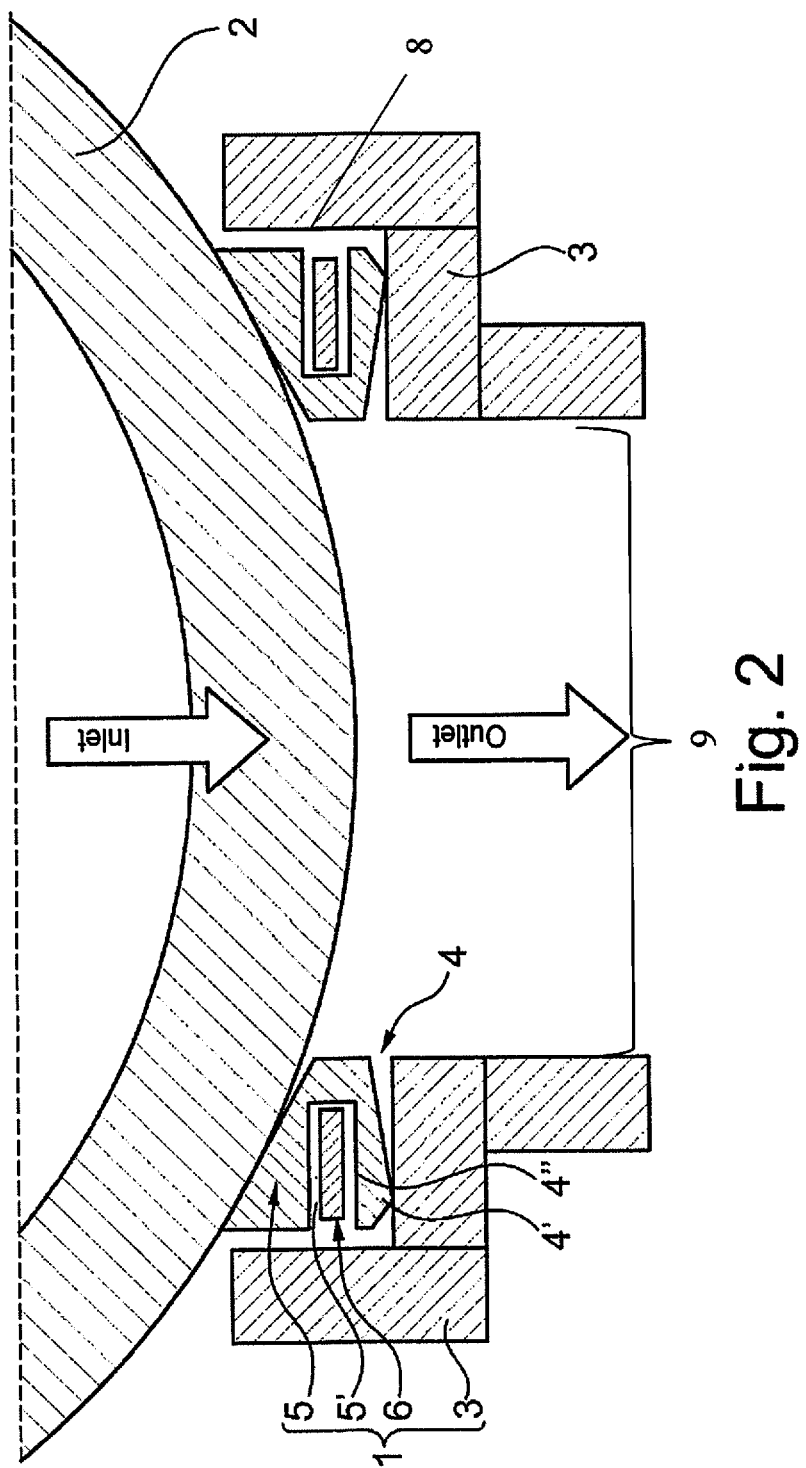
FIG. 2 is a partial enlarged view of the region inside the dotted line in FIG. 1.
Figure 3:
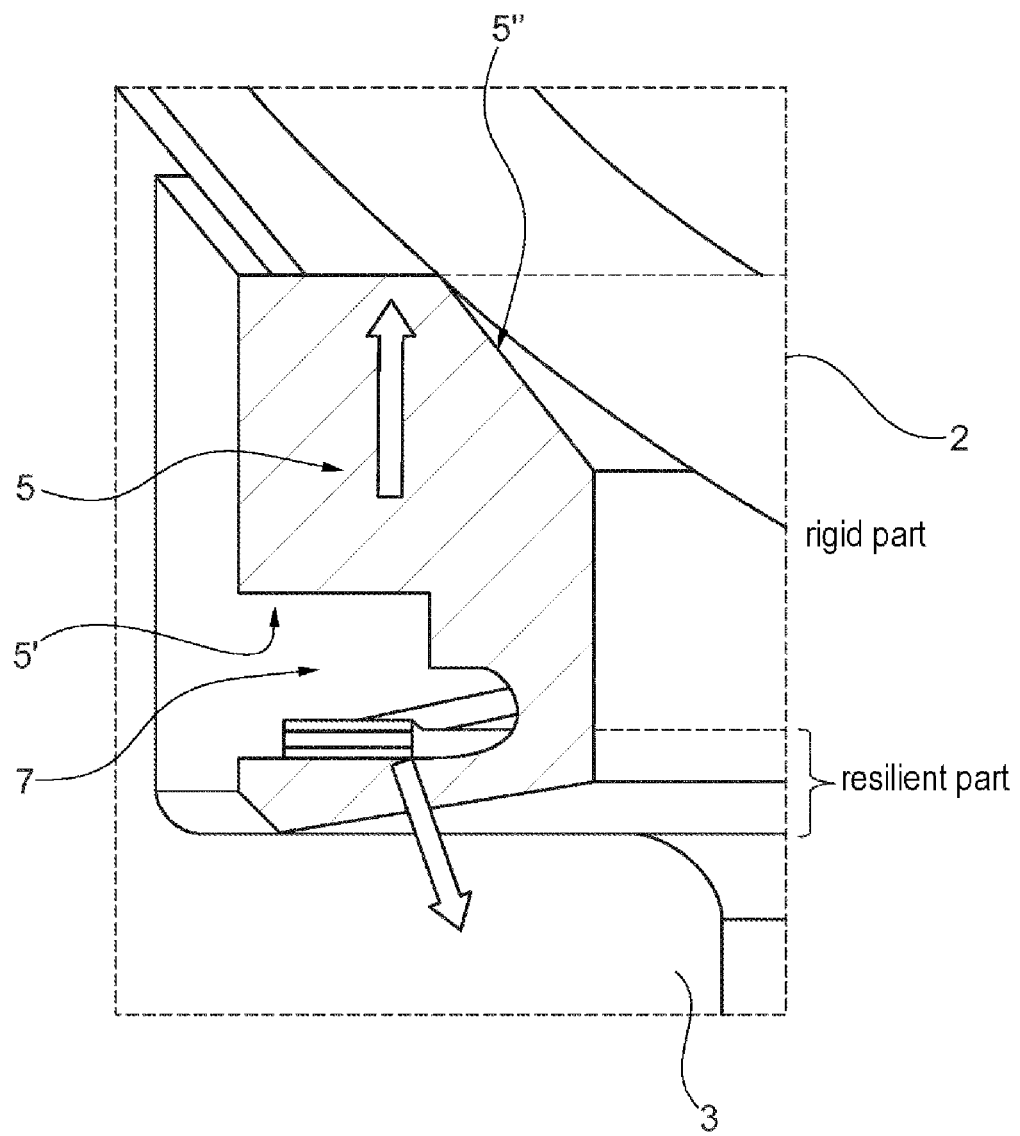
FIG. 3 is a view at a different scale of the seal according to the invention of FIG. 2 explaining, schematically, the operation of the latter with a symbolic illustration of the pressures applied.

FIGS. 1 to 3 show a seal 1 used, as a preferential example, in a conventional rotary ball 2 valve, as found, for example, in the field of the motor vehicle industry. Such a valve comprises several openings and at least one inlet opening and one outlet opening for fluid. For example, the valve ball 2 can be produced by molding a thermoplastic material, for example from PPS (polyphenylene sulfide).

In this instance, such a valve, shown schematically in FIG. 1, has a fluid inlet, a valve ball 2 and a fluid outlet.

It also comprises a hollow valve body 3, provided with at least one inlet opening and at least one outlet opening and defining a receiving chamber for said valve ball 2, the latter having a spherical outer surface, at least at the outer surface portion(s) that come(s) to face the opening(s) in any one of the possible rotational positions of said valve ball 2.

Said valve also comprises at least one device or seal 1 that is made, according to the present invention, as a unitary component, i.e. as one piece, installed coaxially in an emerging internal passage portion 8 of at least one of the openings 9 and comprising an annular body provided with a resilient radial lip 4' forming a tight seal against the inner face of the passage portion and a sealing ring 5 made from a material with a low friction coefficient, carried by the annular sealing body and intended to come to bear in a sealed manner on the outer surface of the valve ball 2, and, finally, an elastic prestressing means 6 axially urging said annular sealing body towards the valve ball 2, the structural unit formed by said annular sealing body and said sealing ring being arranged so as to be able to slide in a guided manner in the emerging passage portion 8 of the opening 9 in question.

According to another embodiment that is also preferred and advantageous, said seal 1 according to the invention, in particular for a rotary ball valve, preferably for a two-way rotary ball valve, is characterized in that it comprises a static annular sealing body 4 that is resilient and flexible and provided with a radial lip 4' and a rigid dynamic sealing ring 5 made from a material with a low friction coefficient, carried by the static annular sealing body 4, the structural unit formed by the static annular sealing body 4 and the dynamic sealing ring 5 being passage portion 8 of the opening 9 in question, the rigid sealing ring 5 coming to bear against said valve ball 2, and the inner face 5' of said sealing ring, opposite that which is in contact with the rotary valve ball 2, coming to face the inner face 4" of the radial lip 4' of the annular sealing body 4, opposite the face coming into contact with the hollow body 3 of the valve, the thrust force produced by the fluid at said seal 4 causing these two elements 4, 5 to move apart in order to ensure tight sealing. This seal that has no elastic prestressing element 6 and is therefore simpler and more economical to manufacture is also characterized in that the static annular sealing body 4 that is resilient and flexible and provided with the radial lip 4' and a rigid dynamic sealing ring 5, are produced as one piece.

Depending on the direction of fluid propagation inside the valve and, therefore, the seal 1, the pressure applied by said fluid causes the two elements 4, 5 to move apart in order to ensure tight sealing of the assembly. Indeed, the pressure of the fluid that infiltrates between the hollow body 3 of the valve and the rotary valve ball 2 already helps compress the radial lip 4'. In this instance, the empty space 7 through which the fluid flows also helps balance and distribute the pressure (FIG. 3). Advantageously, it is possible to adjust the volume of this empty space 7, for example with a deep recess, and/or the elastic properties of the materials forming the elements 4, 5 and/or the force of the elastic prestressing means 6, so as to configure the seal according to the required specifications.

For the remainder of the application, reference can be made to the example provided in which an elastic prestressing means 6 is provided.

In this variant, which is more complex but offers better performance in terms of sealing effectiveness and/or reliability, the seal 1 according to the invention is characterized in that it does indeed have an elastic prestressing means 6 situated between said resilient static annular sealing body 4 and the rigid dynamic sealing ring 5 and urging these two elements 4, 5 axially specifically in order to ensure tight sealing, in particular towards the rotary valve ball 2, said elastic prestressing means 6 coming to bear under pressure against the inner face 5' of the rigid sealing ring 5, opposite that which is in contact with the rotary valve ball 2 and the inner face 4" of the radial lip 4' of the annular sealing body 4, opposite the face coming into contact with the hollow body 3 of the valve, the thrust force produced by said spring 6 causing these two elements 4, 5 to move apart in order to ensure the abovementioned tight sealing.

This abovementioned seal 1, with or without an elastic prestressing means 6, is normally mounted in a seat structure, in the form of concentric annular shoulders, made up by said emerging internal passage portion. This configuration of said passage portion allows the seal 1 to be accommodated without substantially reducing the passage diameter of the opening (no pressure loss when the valve ball 2 is in the open position—substantially identical passage diameters for the opening, the sealing device 1 and the opening of the valve ball 2) while providing a support for the elastic prestressing means 6 when it is present.

For example, FIG. 3 shows the distribution of the rigid part and the resilient part of the seal according to the invention.

Advantageously, the seal 1 according to the invention is characterized in that it is made from a fluoropolymer, or preferably from PTFE or from a material mainly consisting of PTFE, which is known more generally by the registered trademark "Teflon". Naturally, other synthetic materials commonly used for manufacturing seals of this type can also be used.

According to one advantageous feature, the seal 1 according to the invention is further characterized in that the rigid dynamic sealing ring 5 has, in section, a beveled free end intended to provide a potential contact surface 5", in particular for contact with the valve ball 2, that is frustoconical in shape, with a dynamic sealing zone situated between the outer and inner edges of the bevel, and therefore between the outer and inner circular limits of said potential contact surface 5".

According to other advantageous features, the minimum thickness of the rigid part formed by the rigid dynamic sealing ring 5 is 2 mm, and preferably 4 mm, and/or the maximum thickness of the resilient part formed by the static annular sealing body 4 is 1 mm, and preferably 0.6 mm.

Therefore, and as shown schematically by the arrows in FIG. 3, the rigid part in particular helps prevent excessive deformation during the rotation of the valve ball 2. Similarly, the distribution of the applied pressure advantageously helps direct said rigid part towards said valve ball 2 and the radial lip 4', due to its considerable relative resilience, towards the hollow body 3, considering an interface between the two dissociated zones.

The resilient part formed by the radial lip 4' also helps compensate for the total height of the rigid dynamic sealing ring 5.

Surprisingly, the best results in terms of effectiveness and profitability are obtained when the ratio between the minimum thickness of the rigid part formed by the rigid dynamic sealing ring 5 and the maximum thickness of the resilient part formed by the static annular sealing body 4 is between 2 and 10.

According to another aspect of the invention, the radial lip 4' of the static annular sealing body 4 is situated at the rear face 4" of said body 4 and is produced by partial segmentation of an outer peripheral strip of the material constituting the latter, so as to form an elastically deformable skirt that is inclined and protrudes outwards in the absence of stress.

Preferably, the seal 1 according to the invention is characterized in that the elastic prestressing means 6 is, when present, a compression spring, an energizer spring such as a leaf spring, or a wave spring. Other equivalent means for storing mechanical energy can also be envisaged.

Said compression spring (or equivalent) helps move the radial lip 4' away and apply contact pressure to the abovementioned hollow valve body 3 in the resilient part. It also advantageously helps direct the rigid part towards the valve ball 2 in order ensure contact pressure with the latter and produce the desired seal in a constant and reliable manner (see FIG. 3). If not, it is the fluid (liquid or gas) that applies its own pressure to the seal 1, which is sometimes sufficient.

The invention further concerns a rotary ball valve, preferably a two-way spherical rotary ball 2 valve, characterized in that it comprises a seal 1 according to the invention.

Finally, said rotary ball 2 valve can be produced in different structural variants in terms not only of the shape of the valve ball 2 but also the number of openings and the direction of flow of the fluid.

Figure 4A:
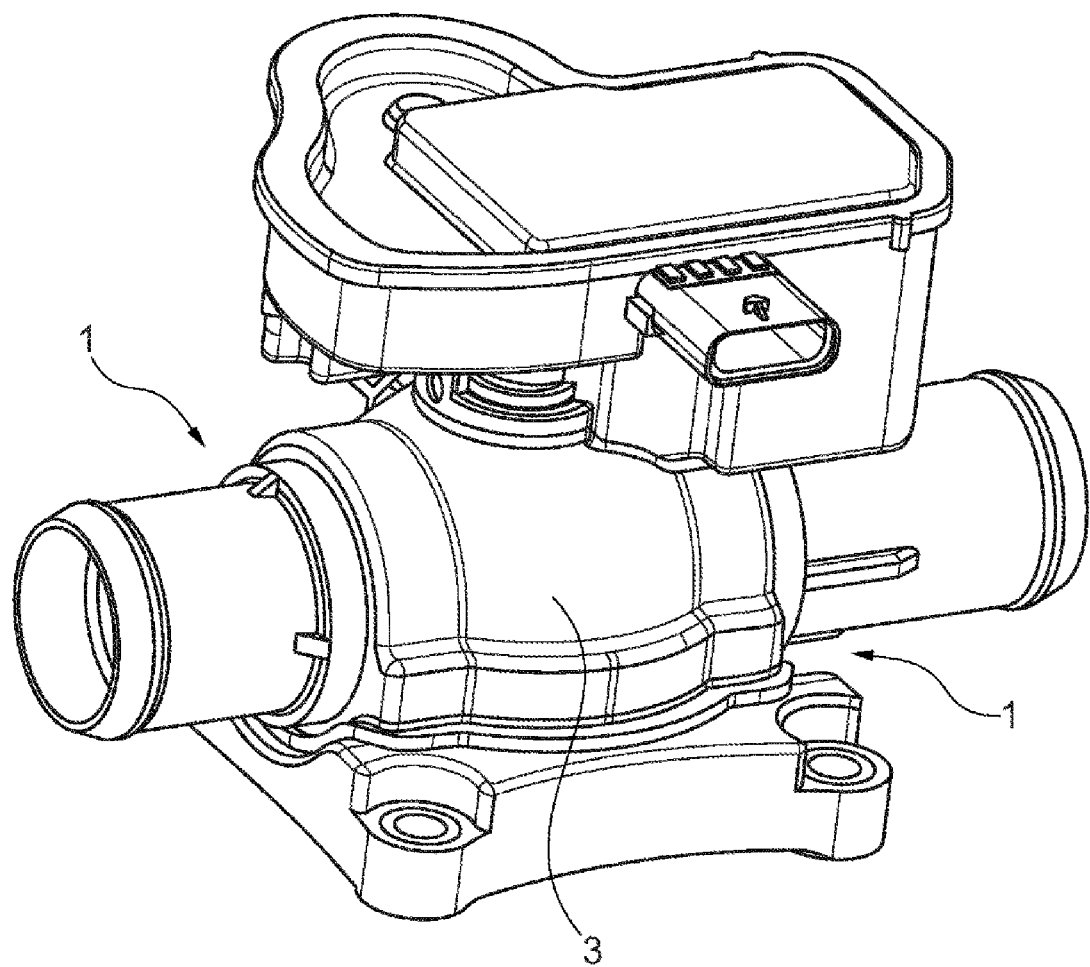

In another embodiment of the invention in which the fluid flows from the outside towards the inside of the valve ball, the seal is inverted, as in FIG. 6, such that the fluid (see the arrows) helps compress the flexible lip of the seal. FIG. 6 is therefore a specific case of FIGS. 4b and 5 which show partial enlarged views of the seal 1 according to the invention cut at the same place with two different fluid flow directions as indicated by the two arrows.

In all the embodiments of the invention, however, at least one of the openings, and preferably all of the openings, comprise(s) a unitary seal 1, as previously described.

As mentioned, in the context of the different structural variants, the valve ball 2 can, in particular, be a spherical valve ball, said valve 1 having, for example, one inlet opening and two outlet openings.

In relation with a preferred application of the ball 2 valve according to the invention, the valve can be integrated structurally into a functional and structural module, being mounted downstream or upstream from a water pump also incorporated into said module, and/or can be mounted (in an integrated or independent manner) in a coolant flow circuit of an internal combustion engine of a motor vehicle.

The invention thus proposes a seal 1 that has only one element intended to form the seal, i.e. the rigid dynamic sealing ring 5 and the radial lip 4', as a result of the pressure originating inside the rotary valve ball 2.

According to the invention, the latter is produced in two parts: a (rigid) thick part in contact with said rotary valve ball 2 and a (resilient) thinner part in contact with the main body 3 of the valve in which it is mounted.

The addition of an elastic prestressing means 6 provides an element that allows mechanical energy to be stored in order to easily and more reliably separate the two above-mentioned parts of said ring.

As indicated above, this element is advantageously a spring. That said, the storage element can also be made from an elastomer material.

The seal 1 according to the invention can also be integrated, particularly advantageously, into any suitable type of valve, in particular a valve referred to as a "multiway" valve, and typically into a two-way valve. Such valves are particularly useful in the field of the motor vehicle industry, in particular for an application in the engine cooling circuit of a motor vehicle.

Naturally, the invention is not limited to the embodiments described and shown in the appended drawings. Modifications remain possible, in particular in terms of the constitution of the various elements or by substituting technical equivalents, without departing from the scope of protection of the invention.

The invention claimed is:

1. A seal for a rotary ball valve, with at least two ways, said seal comprising:
    a static annular sealing body that is resilient and flexible and provided with a radial lip, and a rigid dynamic sealing ring made from a material with a low friction coefficient, carried by said static annular sealing body,
    a structural unit formed by the static annular sealing body and the rigid dynamic sealing ring being arranged so as to be able to slide in a guided manner in an emerging passage portion of an opening, the rigid sealing ring coming to bear against said rotary valve ball, and
    an inner face of said rigid sealing ring, opposite that which is in contact with the rotary valve ball, coming to face an inner face of a radial lip of the annular sealing body, opposite the face coming into contact with a hollow body of the valve, a thrust force produced by the fluid at said seal causing these two elements to move apart in order to ensure tight sealing,
    the static annular sealing body that is resilient and flexible and provided with said radial lip and the rigid dynamic sealing ring are produced as one piece,
    wherein minimum axial thickness of a rigid part formed by the rigid dynamic sealing ring (5) is 2 mm, and wherein a maximum axial thickness of a resilient part formed by the static annular sealing body (4) is 1 mm.

2. The seal as claimed in claim 1, wherein said seal is made from a fluoropolymer, from PTFE or from a material mainly consisting of PTFE.

3. The seal as claimed in claim 1, wherein the rigid dynamic sealing ring has, in section, a beveled free end intended to provide a contact surface, for contact with the valve ball, that is frustoconical in shape, with a dynamic sealing zone situated between the outer and inner edges of the bevel, and therefore between the outer and inner circular limits of said potential contact surface.

4. The seal as claimed in claim 1, wherein the ratio between the minimum axial thickness of the rigid part formed by the rigid dynamic sealing ring and the maximum axial thickness of the resilient part formed by the static annular sealing body is between 2 and 10.

5. The seal as claimed in claim 1, wherein the radial lip of the static annular sealing body is situated at the rear face of said body and is produced by partial segmentation of an outer peripheral strip of the material, so as to form an elastically deformable skirt that is inclined and protrudes outwards in the absence of stress.

6. The seal as claimed in claim 1, wherein said seal has an elastic prestressing means situated between said resilient static annular sealing body and the rigid dynamic sealing ring and urging these two elements axially in order to ensure tight sealing towards the rotary valve ball, said elastic prestressing means coming to bear under pressure against the inner face of the rigid sealing ring, opposite that which is in contact with the rotary valve ball and the inner face of the radial lip of the annular sealing body, opposite the face coming into contact with the hollow body of the valve, the thrust force produced by said spring causing these two elements to move apart in order to ensure tight sealing.

7. The seal as claimed in claim 6, wherein the elastic prestressing means is a compression spring.

8. The seal as claimed in claim 6, wherein the elastic prestressing means is a wave spring.

9. The seal as claimed in claim 6, wherein the elastic prestressing means is a leaf spring referred to as an energizer spring.

10. A two-way spherical rotary ball valve comprising a seal as claimed in claim 1.

* * * * *